US008957654B2

(12) United States Patent
Liu et al.

(10) Patent No.: US 8,957,654 B2
(45) Date of Patent: Feb. 17, 2015

(54) MONITORING METHOD WITH FUNCTION OF CORRELATION-BASED SYSTEM IDENTIFICATION

(71) Applicant: National Cheng Kung University, Tainan (TW)

(72) Inventors: Chun-Yen Liu, Tainan (TW); Chien-Hung Tsai, Tainan (TW); Chun-Hung Yang, Tainan (TW); Shyh-Ming Lin, Tainan (TW)

(73) Assignee: National Cheng Kung University, Tainan (TW)

( * ) Notice: Subject to any disclaimer, the term of this patent is extended or adjusted under 35 U.S.C. 154(b) by 215 days.

(21) Appl. No.: 13/737,117

(22) Filed: Jan. 9, 2013

(65) Prior Publication Data
US 2014/0097817 A1 Apr. 10, 2014

(30) Foreign Application Priority Data
Oct. 8, 2012 (TW) .............................. 101137174 A (51) Int. Cl.
*H02M 3/157* (2006.01)
*H02M 1/14* (2006.01)

(52) U.S. Cl.
USPC ............................................ 323/283; 363/39

(58) Field of Classification Search
USPC ............. 323/241, 283, 322; 363/39; 341/138; 324/606
See application file for complete search history.

(56) References Cited

U.S. PATENT DOCUMENTS

| 7,239,257 B1 * | 7/2007 | Alexander et al. | ............. 341/138 |
| 7,960,963 B1 * | 6/2011 | Zarr | ............................. 323/322 |
| 8,841,923 B1 * | 9/2014 | Vanwiggeren | ................ 324/606 |

* cited by examiner

*Primary Examiner* — Jessica Han
(74) *Attorney, Agent, or Firm* — Rosenberg, Klein & Lee (57) ABSTRACT

A monitoring method with a function of correlation-based system identification applicable for a digitally controlled DC-DC converter system is revealed. The monitoring method includes a plurality of steps. After the system is operated in a steady state, input a pseudo random binary sequence signal into the system via a pseudo random binary sequence generator and store the pseudo random binary sequence signal and an output signal of a path to be monitored in a memory unit. Then perform a correlation analysis of data stored in the memory unit by a correlation analysis module and output an impulse response. Next obtain a frequency response of the impulse response by a discrete-time Fourier transform module. Finally, smooth the frequency response by an adaptive sliding window smoothing module so that a monitoring curve of the frequency response becomes smooth.

13 Claims, 7 Drawing Sheets

MONITORING METHOD WITH FUNCTION OF CORRELATION-BASED SYSTEM IDENTIFICATION

BACKGROUND OF THE INVENTION

1. Field of the Invention

The present invention relates to a monitoring method with a function of correlation-based system identification, especially to a monitoring method with a function of correlation-based system identification being applied to a digitally controlled DC-DC converter system for real-time monitoring frequency response of a power converter module, a digital compensator, or loop gain in the system. Moreover, a monitoring curve of the frequency response can be smoothed through an adaptive sliding window smoothing module. Therefore, data dispersion at intermediate and high frequency bands caused by non-ideal effect is effectively reduced so as to increase identifiable frequency range.

2. Description of Related Art

Along with fast development and rapid progress of digital technology, various kinds of innovative, compact and multi-functional electronic products have been developed. Thus more and more circuit modules including microprocessors, communication interfaces, and data converters etc, need to be integrated. All these modules require power converters for stably power supply. Moreover, for some high-level devices such as satellites, aerospace electronic equipment, industrial servers, etc., performance is not the only criterion to be considered. How to ensure extreme-high stability of system power supplies after long term use for good operation of the system is the most important factor.

Generally, the integrated DC-to-DC power conversion system is divided into buck converters, boost converters, and buck-boost converters according to their configuration. The main components of the converter includes four parts, a power converter for control of buck and boost, an analog-to-digital converter (ADC) for monitoring output voltages, a digital compensator for regulating stability of output voltages, and a digital pulse-width modulation module (DPWM) for control of energy output. The principle of operation of the DC-to-DC power conversion system is described as the following. The digital compensator calculates a duty cycle control (duty command) of the next cycle according to conditions of the output voltage available now. Thus the digital pulse-width modulation module outputs the duty cycle needed according to the requirements of the digital compensator. Then whether a power transistor switch of the power converter turns on is determined according to a duty cycle signal. Perform the switching repeatedly in cycles and the system generates stable direct current voltage.

Due to uncertainty of loading conditions and the power converter (such as on-resistance of the power transistor), it's difficult to design the digital compensator. Moreover, a plurality of factors including drift phenomenon of inductors and capacitors, choices of decoupling capacitors and parasitic effect has effects on the stability of the DC-to-DC power conversion system. In order to minimize negative effects of these factors and satisfy the requirement of highly integrated SoC for compact size and light weight products, a parametric system identification method for analysis of a small-signal model of the DC-to-DC power converter is revealed in some research. For modeling, the system structure must be learned firstly so as to estimate unknown parameters of the system model (such as transfer function, coefficient of state space matrix, etc). However, not all factors are taken into consideration in mathematical analysis. Especially for high-level and complicated system models, they are difficult to be constructed and analyzed. Thus frequency analysis results of the system are affected by imprecise modeling.

In order to improve the above shortcomings, a monitoring mechanism is set up in the DC-DC converter system for monitoring control loops. Moreover, users can understand conditions of the system by analyzing response of system loops and further know whether the system is stable.

Thus there is room for improvement and a need to provide a novel monitoring method of loop response of the DC-to-DC power conversion system that overcomes the above shortcomings.

SUMMARY OF THE INVENTION

Therefore it is a primary object of the present invention to provide a monitoring method with a function of correlation-based system identification being applied to a digitally controlled DC-DC converter system for real-time monitoring frequency response of a power converter module, a digital compensator, or loop gain in the system. Moreover, a monitoring curve of the frequency response is smoothed through an adaptive sliding window smoothing module. Thus data dispersion at intermediate and high frequency bands caused by non-ideal effect is effectively reduced and identifiable frequency range is increased.

In order to achieve the above object, a monitoring method with a function of correlation-based system identification being applied to a digitally controlled DC-DC converter system of the present invention is provided. The digitally controlled DC-DC converter system includes a power converter module, an analog to digital converter module connected to an output end of the power converter module, a digital compensator connected to an output end of the analog to digital converter module, and a digital pulse-width modulation module respectively connected to an output end of the digital compensator and the power converter module. A monitoring method with a function of correlation-based system identification of the present invention includes following steps. At first, input a pseudo random binary sequence signal into the digitally controlled DC-DC converter system via a pseudo random binary sequence generator after the digitally controlled DC-DC converter system is operated in a steady state. Then store the pseudo random binary sequence signal and an output signal of a path to be monitored in a memory unit. Next perform a correlation analysis on data stored in the memory unit by a correlation analysis module and output an impulse response. Then acquire a frequency response in relation to the impulse response by a discrete-time Fourier transform module. At last, smooth the frequency response by using an adaptive sliding window smoothing module so that a monitoring curve of the frequency response becomes smooth and data dispersion at intermediate-and-high frequency bands is effectively reduced. Thus identifiable frequency range is increased.

In the above monitoring method with a function of correlation-based system identification, after outputting an impulse response, truncate disturbance part of the impulse response by using an impulse response filter module. The impulse response filter module is operated based on a method selected from the group including an averaging impulse response method, a Gaussian window method and an impulse-response truncation (IRT) method. It is preferred to use the impulse-response truncation (IRT) method.

In the above monitoring method, the pseudo random binary sequence generator further provides a process of minimizing an autocorrelation function $R_{uu}$ of the pseudo random binary sequence signal and a function δ. Moreover, the pseudo random binary sequence signal is preferred to be periodic.

In the above monitoring method, the correlation analysis module provides a circular correlation analysis process for solving the problem of too much time the monitoring process takes for data collection when the autocorrelation function of the pseudo random binary sequence signal converges to the function δ.

In the monitoring method mentioned above, the width of a sliding window of the adaptive sliding window smoothing module can be increased along with the increasing frequency.

In the above monitoring method, the pseudo random binary sequence signal is input into the output end of the digital compensator while the output signal of the path to be monitored is an output signal of the analog to digital converter module. Thus a frequency response of the power converter module is generated after a monitoring process being completed by the adaptive sliding window smoothing module.

In the above monitoring method, the pseudo random binary sequence signal is input into the input end of the digital compensator while the output signal of the path to be monitored is an output signal of the digital compensator. Thus a smoothed frequency response of the digital compensator is obtained after a monitoring process being completed by the adaptive sliding window smoothing module. Thereby monitoring and verifying of the digital compensator are both achieved so as to make a choice between the design of the digital compensator and the hardware cost.

In the above monitoring method, the pseudo random binary sequence signal is input into the input end of the digital compensator and the output signal of the path to be monitored is the output signal of the analog to digital converter module. Thus a smoothed frequency response of the loop gain is obtained after the monitoring process being completed by the adaptive sliding window smoothing module.

Thereby a monitoring method with (a function of) correlation-based system identification of the present invention is built in a DC-DC converter system (DC-DC converter system) so that frequency responses of the control loop is monitored in a real-time manner. Then analyze response of system loops and this is like adding a network analyzer into the DC-DC converter system. Thus users can learn conditions of the system and further know whether the system is stable.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
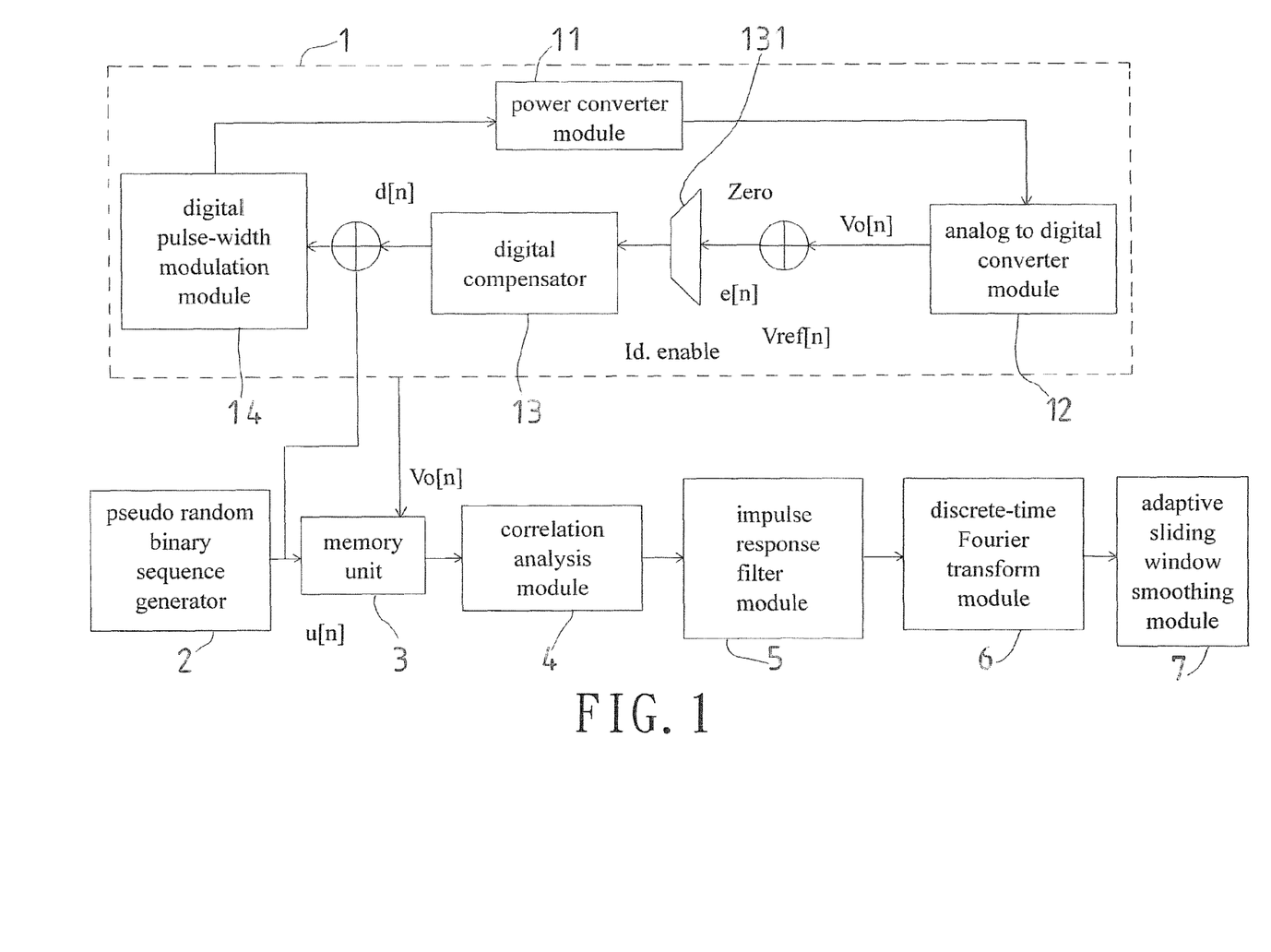
FIG. 1 is a block diagram showing circuit configuration of an embodiment according to the present invention.
Figure 2:
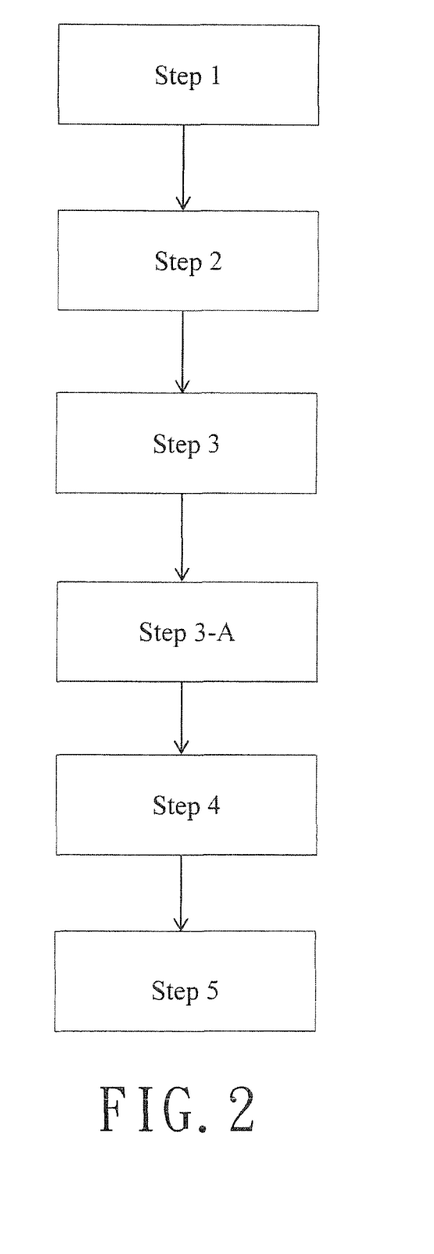
FIG. 2 is a flow chart showing steps of a monitoring method with (a function of) correlation-based system identification according to the present invention.

Refer to FIG. 1, a block diagram showing arrangement of electronic components of an embodiment according to the present invention is revealed. This is used to monitor frequency response of a power converter module 11. Also refer to FIG. 2, a flow chart showing steps of a monitoring method of the present invention. A monitoring method with a function of correlation-based system identification of the present invention is applied in a digitally controlled DC-DC converter system 1. The digitally controlled DC-DC converter system 1 consists of a power converter module 11, an analog to digital converter module 12 connected to an output end of the power converter module 11, a digital compensator 13 connected to an output end of the analog to digital converter module 12, and a digital pulse-width modulation module 14 respectively connected to an output end of the digital compensator 13 and the power converter module 11. The monitoring method with a function of correlation-based system identification includes following steps:

Step 1 (S1): inputting a pseudo random binary sequence signal into the digitally controlled DC-DC converter system 1 via a pseudo random binary sequence generator (PRBS) 2. The pseudo random binary sequence signal is periodic.

Step 2 (S2): storing the pseudo random binary sequence signal and an output signal of a path to be monitored into a memory unit 3.

Step 3 (S3): performing a correlation analysis of data stored in the memory unit 3 by a correlation analysis module 4 and outputting an impulse response. After the step 3 (S3), the monitoring method further includes a step 3-A (S3-A), truncating disturbance of the impulse response by an impulse response filter module 5. The impulse response filter module 5 is operated base on a principle selected from the group consisting of an averaging impulse response method, a Gaussian window method and an impulse-response truncation (IRT) method. In this embodiment, the impulse-response truncation method is used in the impulse response filter module 5.

Step 4 (S4): acquiring a frequency response in relation to the impulse response by a discrete-time Fourier transform (DTFT) module 6; and Step 5 (S5): smoothing the frequency response by an adaptive sliding window smoothing (ASWS) module 7. In this embodiment, the pseudo random binary sequence signal is input into the output end of the digital compensator 13 while the output signal of the path to be monitored is an output signal of the analog to digital converter module 12 so as to generate a frequency response of the power converter module 11.

Moreover, analyze a small-signal model of the system by using small-signal analysis. The small-signal model is equivalent to a linear time invariant discrete time system when the system is operated in a steady state. A sampling signal y[n] output from the system is represented by the following mathematical expression:

$$y[n] = \sum_{k=-\infty}^{\infty} h[k] \cdot u[n-k] + v[n];$$

wherein h[k] is discrete time impulse response, u[k] is an input test signal and v[n] represents at least one noise in the system such as measurement error, quantization noise, switching noise, etc.

Furthermore, according to the definition of the cross-correlation function:

$$R_{uy}[n] = \lim_{L\to\infty} \frac{1}{2L+1} \sum_{p=-L}^{L} u[p] \cdot y[n+p],$$

wherein $R_{uy}$ is a cross-correlation function of an input signal μ and an output signal y.

Thus the sampling signal y[n] output from the system is substituted into the above cross-correlation equation.

$$R_{uy}[n] = \sum_{k=-\infty}^{\infty} h[k] R_{uu}[n-k] + R_{uv}[n];$$

wherein, $R_{uu}$ is an autocorrelation function of the input signal μ.

In order to get the impulse response h[k], it is assumed that the input signal μ is a white noise and the noise in the system v[n] and the input signal μ (white noise) are coming from different sources (that means $R_{uv}[n]$=0). Then the impulse response h[k] of the system times the autocorrelation function of the white noise to get the impulse of height. That's the cross-correlation function $R_{uy}$ of the input signal μ and the output signal y.

However, an infinite-bandwidth white noise signal is a purely theoretical construction. The bandwidth of the white noise is limited in practice. Thus the pseudo random binary sequence generator 2 of the present invention further provides a function of minimizing the autocorrelation function $R_{uu}$ of the pseudo random binary sequence signal to a function δ so as to eliminate monitoring errors of a non-zero noise in relation to the impulse response. The non-zero noise is resulted from the pseudo random binary sequence signal.

Figure 3:
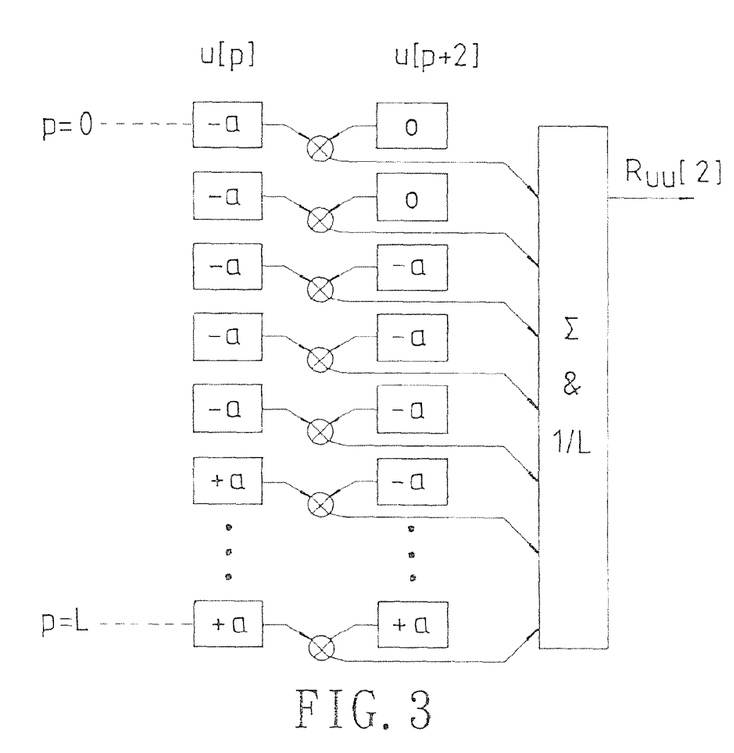
FIG. 3 is a schematic drawing showing a conventional non-circular correlation process.
Figure 4:
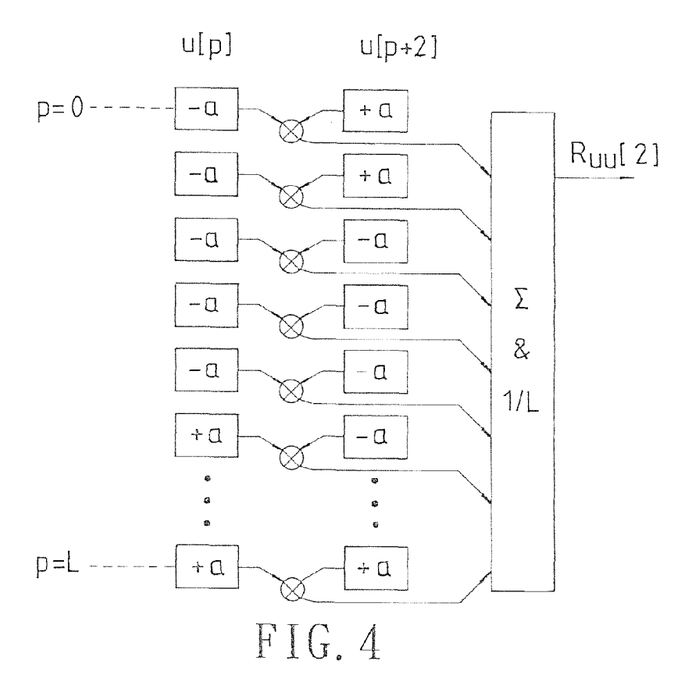
FIG. 4 is a schematic drawing showing a circular correlation process of an embodiment according to the present invention.

In addition, the correlation analysis module 4 of the present invention further provides a circular correlation analysis process for solving the problem of taking too much time of the monitoring process for data collection when the autocorrelation function of the pseudo random binary sequence signal converges to the function δ. Refer to FIG. 3 and FIG. 4, schematic drawings respectively show a conventional non-circular correlation process and the circular correlation process of the present invention. While performing autocorrelation analysis of the pseudo random binary sequence signal μ with a limited length, the FIG. 3 and FIG. 4 shows there is a delay of two time units (n=+2) between two signals. n represents a time delay between the two signals. According to the non-circular correlation process in FIG. 3, it is learned that the signals on the right side have been shifted so that positions of p=0 and p=1 are available. For calculating the positions of p=0 and p=1, zero value is given. Yet this causes delay in other time (n≠0) and the calculation results of the autocorrelation function $R_{uu}[n\neq 0]$ of the pseudo random binary sequence signal are not fixed values. On the other hand, the present invention refills values shifted from p=L into the positions of p=0 and p=1. This is the circular correlation process that causes delay of two data sequences in other time and the calculation results of the autocorrelation function $R_{uu}[n\neq 0]$ of the pseudo random binary sequence signal are fixed values. The calculation is as following $$R_{uu}[n] = \frac{1}{L}\sum_{p=0}^{L-1} u[p] \cdot u[n+p] = \begin{cases} \alpha^2, & n = 0, \pm L, \pm 2L, \ldots \\ \frac{-\alpha^2}{L}, & \text{otherwise} \end{cases};$$

wherein L represents the length of the pseudo random binary sequence signal and α represents disturbance magnitude. Thus noises of the autocorrelation function $R_{uu}$ of the input signals (the pseudo random binary sequence signal) are improved and the autocorrelation function $R_{uu}$ is getting closer to the function δ.

When the monitoring method with a function of correlation-based system identification is applied to the digitally controlled DC-DC converter system 1, refer to FIG. 1, the digitally controlled DC-DC converter system 1 is firstly operated in a steady state. That means to observe whether discrete error signals e[n] output by the analog to digital converter module 12 are zero at all time. If the discrete error signal e[n] is maintained at zero, an output digital signal d[n] of the digital compensator 13 is locked to a fixed value, which is a duty cycle signal value D[n] of the steady state. Then a signal u[n] generated by the pseudo random binary sequence generator 2 is added with D[n] so that the signal the digital pulse-width modulation module 14 received is D[n]+u[n]. Thus the digital pulse-width modulating module 14 randomly changes magnitude of on-time of the duty cycle so that disturbance occurs in an output signal $V_O[n]$ from the analog to digital converter module 12. Next the memory unit 3 collects and stores the signals u[n] from the pseudo random binary sequence generator 2 and the output signals $V_O[n]$ from the analog to digital converter module 12 until the monitoring process being completed. Moreover, in this embodiment, the pseudo random binary sequence signal is 12 bit and is synchronous with the switching cycle 391 kHz. It takes 10.49 ms to complete a single-cycle monitoring. At last, the signals the memory unit 3 collected are processed by the impulse-response truncation (IRT) method of the impulse response filter module 5. A non-ideal part (disturbances at a rear-end) of the system impulse response is truncated. Then the system impulse response is converted into a frequency response by the discrete-time Fourier transform (DTFT) module 6. Finally, smooth the frequency response by using an adaptive sliding window smoothing module 7. Thus data points on the frequency response converge to the theoretical curve. Therefore the frequency range able to be identified is increased and users can identify easily.

Figure 5:
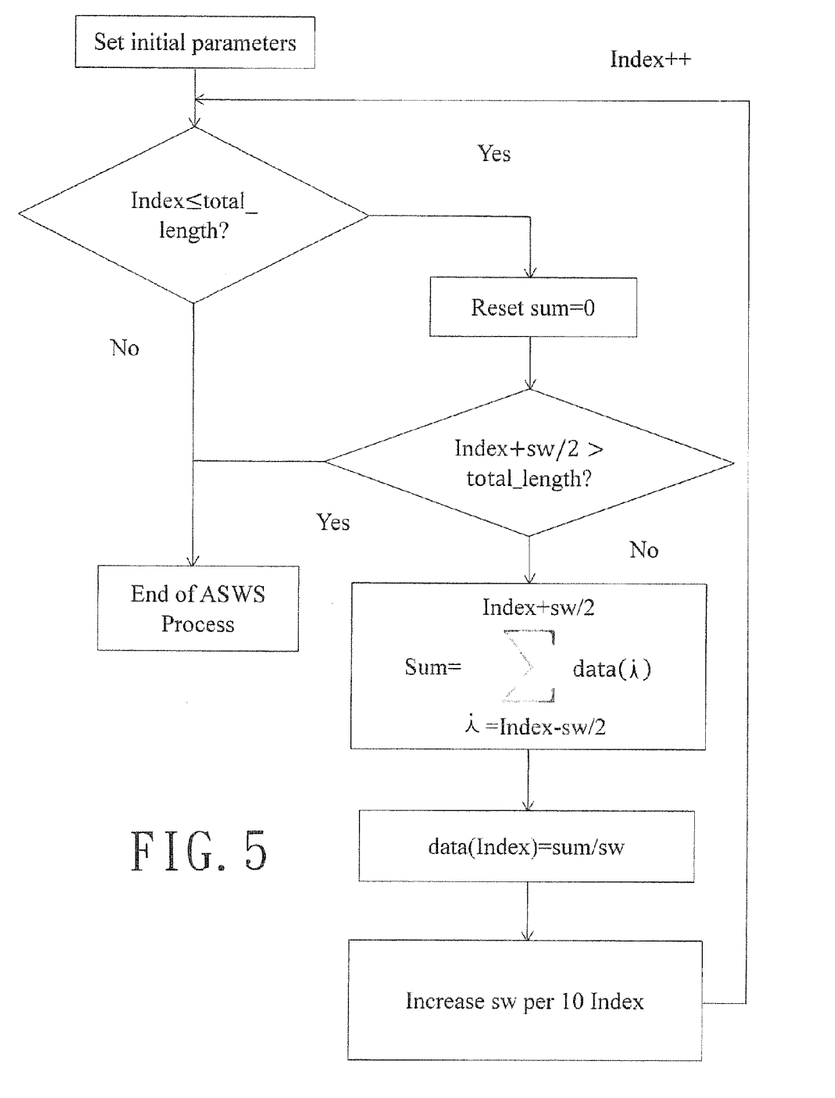
FIG. 5 is an algorithm flow chart showing how an adaptive sliding window smoothing module changes window width of an embodiment according to the present invention.

In order to keep balance between less distortion at low frequency band (<20 kHz) and less dispersion of data points at intermediate-and-high frequency bands (>20 kHz), the width of a sliding window of the adaptive sliding window smoothing module 7 can be increased along with the increasing frequency. The algorithm flow chart is shown in FIG. 5. The initial parameter values includes the number of total data points (total length), data index (Index), sliding window width (sw), etc. The data index is the intermediate position of data points within a range the window covers. When the adaptive sliding window smoothing module 7 starts processing, the data index is smaller than the number of total data points. Then the data index is used as a center to get equal amount of data from the right side and the left side therefrom. Add the total amount of data including the data of the index position and then average the result. An average value obtained is substituted for the data value of the index position.

Next increase a width of one sliding window at an interval of 10 data indices. It should be noted that the number of the data indices in each interval is not limited to 10, and the number is associated with the number of total data points and LC resonant frequency of the monitoring system.

Figure 6:
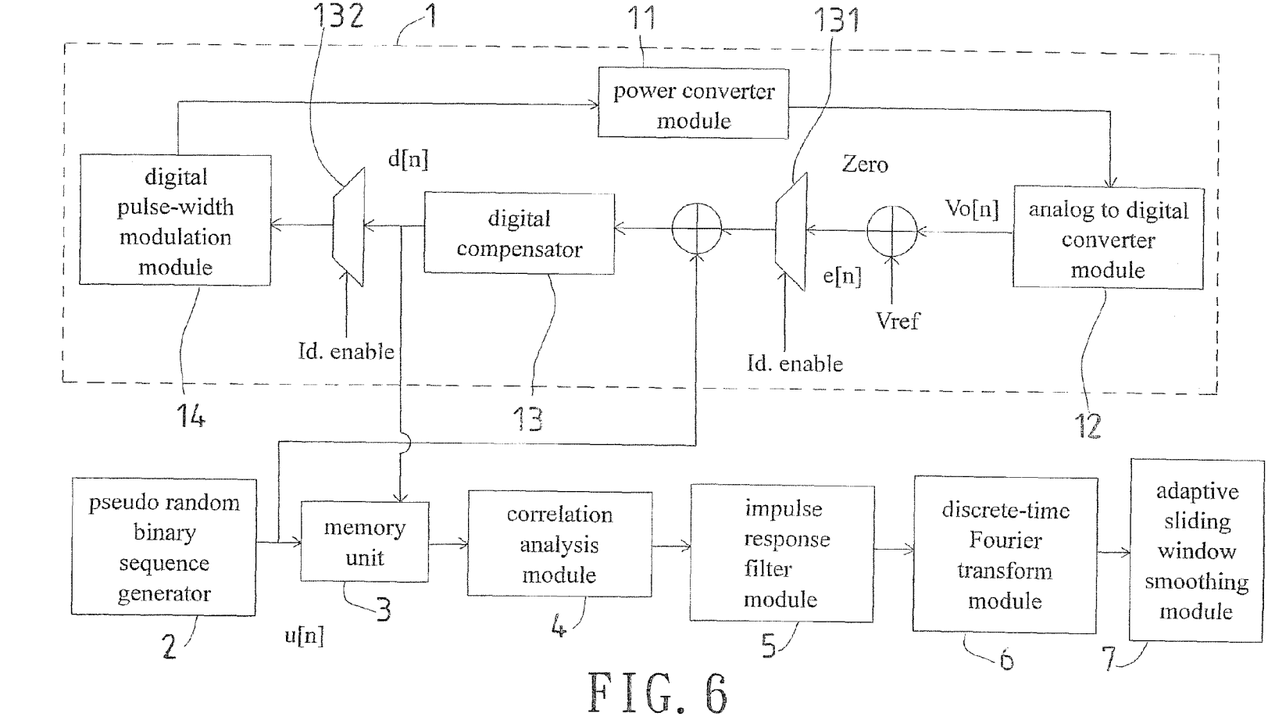
FIG. 6 is a block diagram showing circuit configuration of another embodiment according to the present invention.

Refer to FIG. 6, a block diagram showing circuit configuration of another embodiment according to the present invention is revealed. The difference between this embodiment and the above one is in that the pseudo random binary sequence signal is input into the input end of the digital compensator 13 and the output signal of the path to be monitored is the output signal of the digital compensator 13. Thus a smoothed frequency response of the digital compensator 13 is obtained after the monitoring process being completed by the adaptive sliding window smoothing module 7. While in use, when the digitally controlled DC-DC converter system 1 is operated in a steady state, an output digital signal d[n] of the digital compensator 13 is locked to a fixed value D[n]. Then a first multiplexer 131 on the input end of the digital compensator 13 is switched to zero input and is added with a signal u[n] generated by the pseudo random binary sequence generator 2 to work as the input signal of the digital compensator 13. Moreover, a second multiplexer 132 on the output end of the digital compensator 13 is switched to output the duty cycle signal D[n] at the steady state to ensure that there is no disturbance signal in the output voltage during a process the digital compensator 13 being monitored by the digitally controlled DC-DC converter system 1. Then the output signal d[n] of the digital compensator 13 and the signal u[n] from the pseudo random binary sequence generator 2 is processed by a correlation analysis module 4, an impulse response filter module 5, a discrete-time Fourier transform module 6 and an adaptive sliding window module 7 so as to get the frequency response of the digital compensator 13 being monitored.

Figure 7:
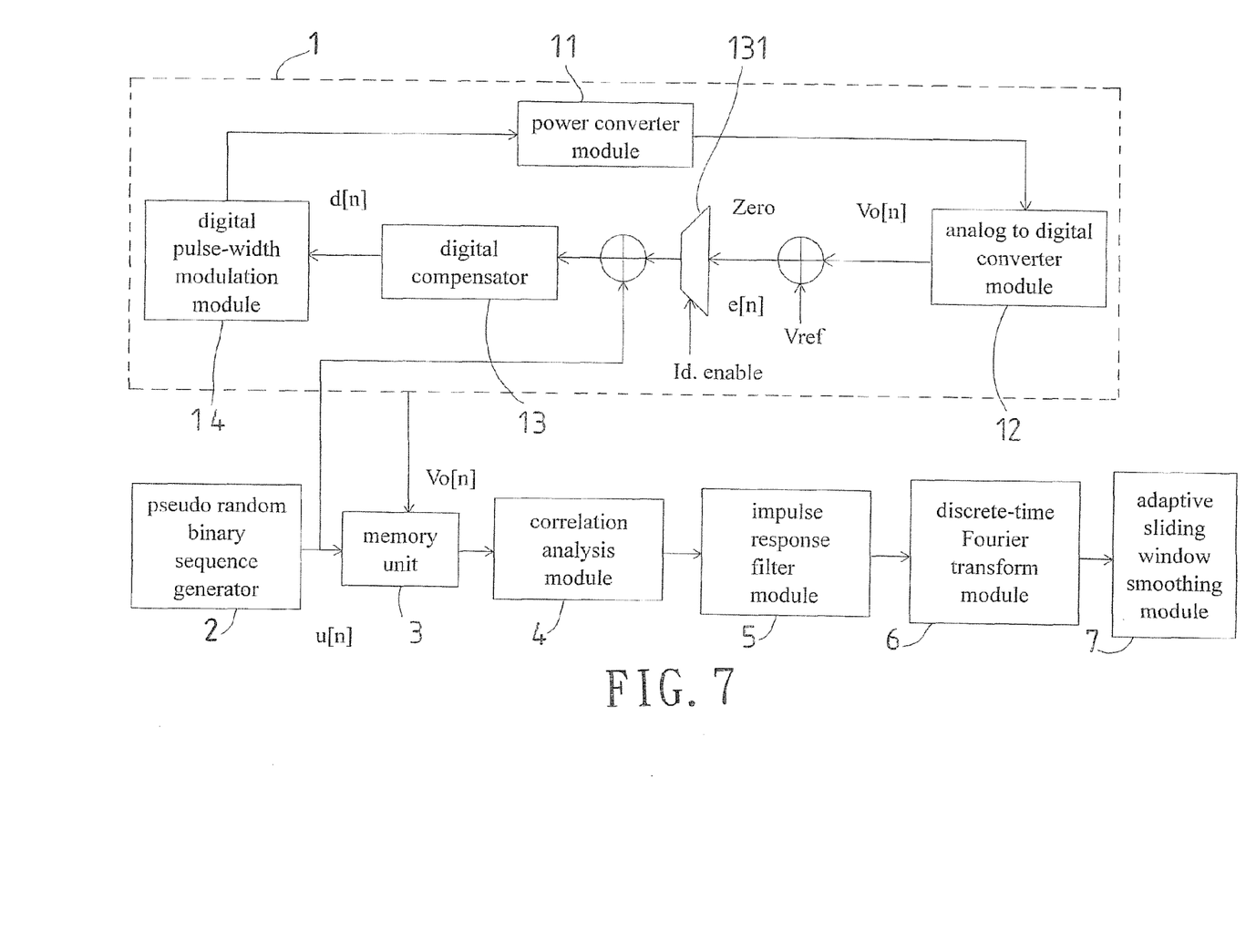
FIG. 7 is a block diagram showing circuit configuration of a further embodiment according to the present invention.

Refer to FIG. 7, a block diagram showing circuit configuration of a further embodiment according to the present invention is revealed. The difference between this embodiment and the above two embodiments is in that the pseudo random binary sequence signal is input into the input end of the digital compensator 13 and the output signal of the path to be monitored is the output signal of the analog to digital converter module 12. Thus a smoothed frequency response of the loop gain is obtained after the monitoring process being completed by the adaptive sliding window smoothing module 7. A pseudo random binary sequence generator 2, a memory unit 3, a correlation analysis module 4, an impulse response filter module 5, a discrete-time Fourier transform module 6 and an adaptive sliding window smoothing module 7 in this embodiment have the same function and usage as those in the above embodiments.

In summary, the present invention has following advantages:
1. A monitoring method with a function of correlation-based system identification is applied to a DC-DC converter system for real-time monitoring of frequency response of a control loop. Then perform analysis of system loop response. This is like addition of a network analyzer into the DC-DC converter system. Thus users can learn conditions of the system and further know whether the system is stable.
2. In the monitoring method of the present invention, a monitoring curve of the frequency response becomes smooth by the adaptive sliding window smoothing module and data dispersion at intermediate and high frequency bands caused by non-ideal effect is effectively reduced. Thus identifiable frequency range is increased.
3. The present invention monitors various components and observes quantization effects of digital compensator coefficient by the function of correlation-based system identification. Thereby monitoring and verifying of the digital compensator are both achieved so as to make a choice between the design of the digital compensator and the hardware cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A monitoring method with a correlation-based system identification function applied to a digitally controlled DC-DC converter system comprising the steps of
   step 1: inputting a pseudo random binary sequence signal into a digitally controlled DC-DC converter system via a pseudo random binary sequence (PRBS) generator;
   step 2: storing the pseudo random binary sequence signal and an output signal of a path to be monitored into a memory unit;
   step 3: performing a correlation analysis of data stored in the memory unit by a correlation analysis module and outputting an impulse response;
   step 4: getting a frequency response in relation to the impulse response by a discrete-time Fourier transform (DTFT) module; and
   step 5: smoothing the frequency response by an adaptive sliding window smoothing (ASWS) module.

2. The method as claimed in claim 1, wherein the digitally controlled DC-DC converter system is operated in a steady state.

3. The method as claimed in claim 1, wherein after the step 3, the method further includes a step 3-A of truncating disturbance of the impulse response by an impulse response filter module.

4. The method as claimed in claim 3, wherein the impulse response filter module works based on a method selected from the group consisting of an averaging impulse response method, a Gaussian window method and an impulse-response truncation (IRT) method.

5. The method as claimed in claim 4, wherein the impulse response filter module works based on the impulse-response truncation method.

6. The method as claimed in claim 1, wherein the pseudo random binary sequence signal is periodic.

7. The method as claimed in claim 1, wherein the pseudo random binary sequence generator provides a process of minimizing an autocorrelation function $R_{uu}$ of the pseudo random binary sequence signal to a function $\delta$.

8. The method as claimed in claim 1, wherein the correlation analysis module provides a circular correlation analysis process.

9. The method as claimed in claim 1, wherein width of a sliding window of the adaptive sliding window smoothing module is increased along with increasing frequency.

10. The method as claimed in claim 1, wherein the digitally controlled DC-DC converter system includes a power converter module, an analog to digital converter module connected to an output end of the power converter module, a digital compensator connected to an output end of the analog to digital converter module, and a digital pulse-width modulation module connected to an output end of the digital compensator and the power converter module respectively.

11. The method as claimed in claim 10, wherein the pseudo random binary sequence signal is input into the output end of the digital compensator and the output signal of the path to be monitored is an output signal of the analog to digital converter module; a frequency response of the power converter module is obtained after the step 5 being completed.

12. The method as claimed in claim 10, wherein the pseudo random binary sequence signal is input into an input end of the digital compensator while the output signal of the path to be monitored is an output signal of the digital compensator; a frequency response of the digital compensator is obtained after the step 5 being completed.

13. The method as claimed in claim 10, wherein the pseudo random binary sequence signal is input into an input end of the digital compensator and the output signal of the path to be monitored is the output signal of the analog to digital converter module; a frequency response of loop gain is obtained after the step 5 being completed.

\* \* \* \* \*